US011419039B2

(12) United States Patent
He et al.

(10) Patent No.: US 11,419,039 B2
(45) Date of Patent: Aug. 16, 2022

(54) SYSTEM AND METHOD FOR INDICATING INFORMATION

(71) Applicant: ZTE CORPORATION, Guangdong (CN)

(72) Inventors: Haigang He, Guangdong (CN); Peng Hao, Guangdong (CN); Feng Bi, Guangdong (CN); Xing Liu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 24 days.

(21) Appl. No.: 16/925,760

(22) Filed: Jul. 10, 2020

(65) Prior Publication Data

US 2020/0344671 A1    Oct. 29, 2020

Related U.S. Application Data

(63) Continuation of application No. PCT/CN2018/076452, filed on Feb. 12, 2018.

(51) Int. Cl.
*H04W 48/08*    (2009.01)
*H04W 72/12*    (2009.01)
*H04W 84/04*    (2009.01)

(52) U.S. Cl.
CPC ....... *H04W 48/08* (2013.01); *H04W 72/1273* (2013.01); *H04W 72/1289* (2013.01); *H04W 84/042* (2013.01)

(58) Field of Classification Search
CPC ............ H04W 48/08; H04W 72/1237; H04W 72/1289; H04W 84/042
USPC ................ 370/329, 328, 338, 341, 345, 350
See application file for complete search history.

(56) References Cited

U.S. PATENT DOCUMENTS

| | | | |
|---|---|---|---|
| 2016/0095018 A1* | 3/2016 | Vajapeyam | H04W 74/0808 370/331 |
| 2016/0302084 A1* | 10/2016 | Song | H04H 20/57 |
| 2017/0353256 A1* | 12/2017 | Islam | H04L 25/022 |
| 2018/0027544 A1* | 1/2018 | Kimura | H04W 72/0473 370/330 |

FOREIGN PATENT DOCUMENTS

| | | |
|---|---|---|
| CN | 106851840 A | 6/2017 |
| WO | 2017077015 A1 | 5/2017 |

* cited by examiner

*Primary Examiner* — Nghi H Ly
(74) *Attorney, Agent, or Firm* — Duane Morris LLP

(57) ABSTRACT

A system and method for allocating network resources are disclosed herein. In one embodiment, the system and method are configured to perform: transmitting a message to a wireless communication device through a first channel. In some embodiments, the message indicates a portion of system information that is configured to be transmitted through a second channel different from the first channel.

16 Claims, 4 Drawing Sheets

SYSTEM AND METHOD FOR INDICATING INFORMATION

TECHNICAL FIELD

The disclosure relates generally to wireless communications and, more particularly, to systems and methods for using a downlink control signal.

BACKGROUND

In wireless communications, a base station (BS) typically sends one or more signals containing Downlink Control Information (DCI), hereinafter "DCI signal," through a control channel (e.g., a Physical Downlink Control Channel (PDCCH)) to a user equipment (UE) for scheduling a plurality of signals that are transmitted to the UE through a transport channels (e.g., a Physical Downlink Shared Channel (PDSCH), a Random Access Channel (RACH), etc.). For example, respective scheduling and/or grant information (e.g., a Modulation and Coding Scheme (MCS) and/or frequency/time allocated resources) of signals carrying some system information that are configured to be transmitted over the PDSCH (e.g., Remaining Minimum System Information (RMSI), Other System Information (OSI) etc.) and signals that are configured to be transmitted over the RACH (e.g., Msg 2, or typically known as a random access response signal) are generally indicated in the DCI signal.

However, such scheduling and grant information of the RMSI, OSI, and/or Msg 2, for example, typically occupy a relatively small amount of bits in the total bits of a format used by the DCI signal (e.g., a DCI format 1_0), which constitutes an undesirable waste of available bits (or fields) of the DCI format. Thus, existing techniques to use the DCI signal are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a wireless communication node includes: transmitting a message to a wireless communication device through a first channel. In some embodiments, the message indicates a portion of system information that is configured to be transmitted through a second channel different from the first channel.

In a further embodiment, a method performed by a wireless communication device includes: receiving a message from a wireless communication node through a first channel. In some embodiments, the message indicates a portion of system information that is configured to be transmitted through a second channel different from the first channel.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
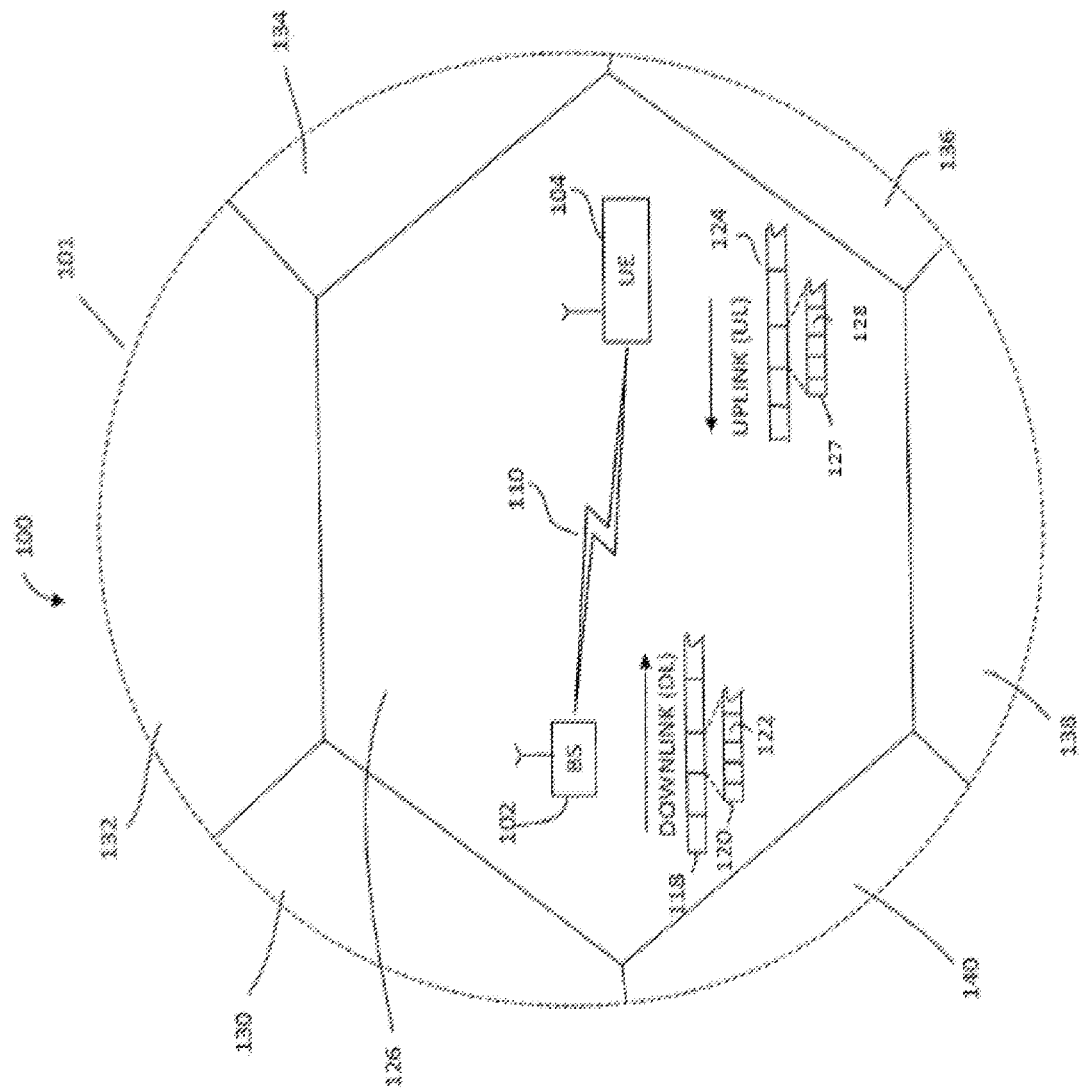
FIG. 1 illustrates an exemplary cellular communication network in which techniques disclosed herein may be implemented, in accordance with an embodiment of the present disclosure.

FIG. 1 illustrates an exemplary wireless communication network, or system, 100 in which techniques disclosed herein may be implemented, in accordance with an embodiment of the present disclosure. Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
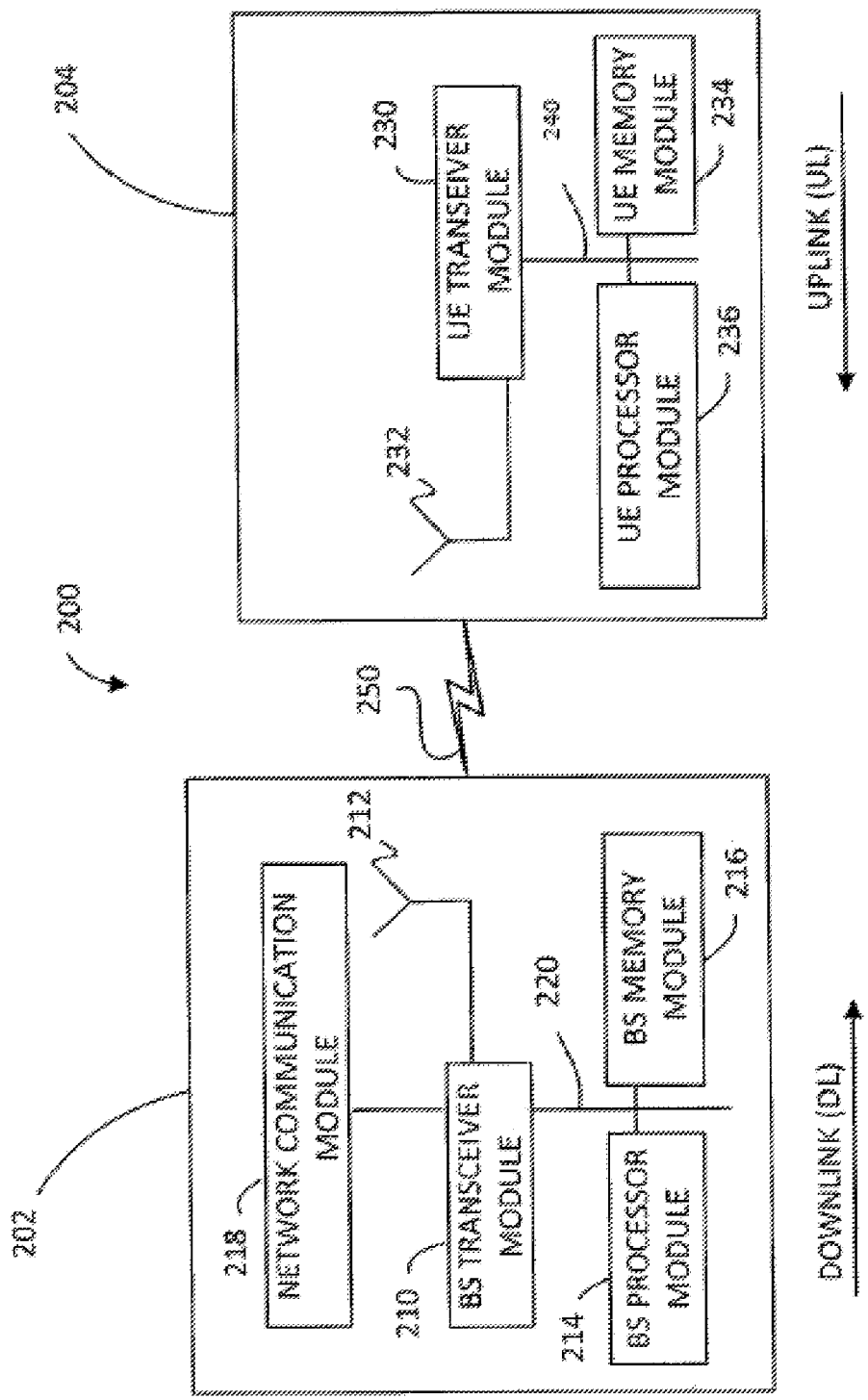
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 210 and the base station transceiver 210 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

As identified above, when a BS sends a DCI signal using a DCI format through a control channel to a UE for scheduling signals that will be transmitted over respective transport channels, some bits of the DCI format are undesirably wasted. According to various embodiments of the present disclosure, a BS (e.g., the BS 102 of FIG. 1) can use a DCI signal, which is transmitted through a control channel, to carry some information that was originally to be carried by signals transmitted through a transport channel. As such, respective bits of the format used by the DCI signal can be more thoroughly used and/or the information that is prioritized to be carried in the DCI signal can be received by a corresponding UE (e.g., the UE 104 of FIG. 1), which may advantageously help the UE to more accurately decode the signals subsequently sent by the BS.

Figure 3:
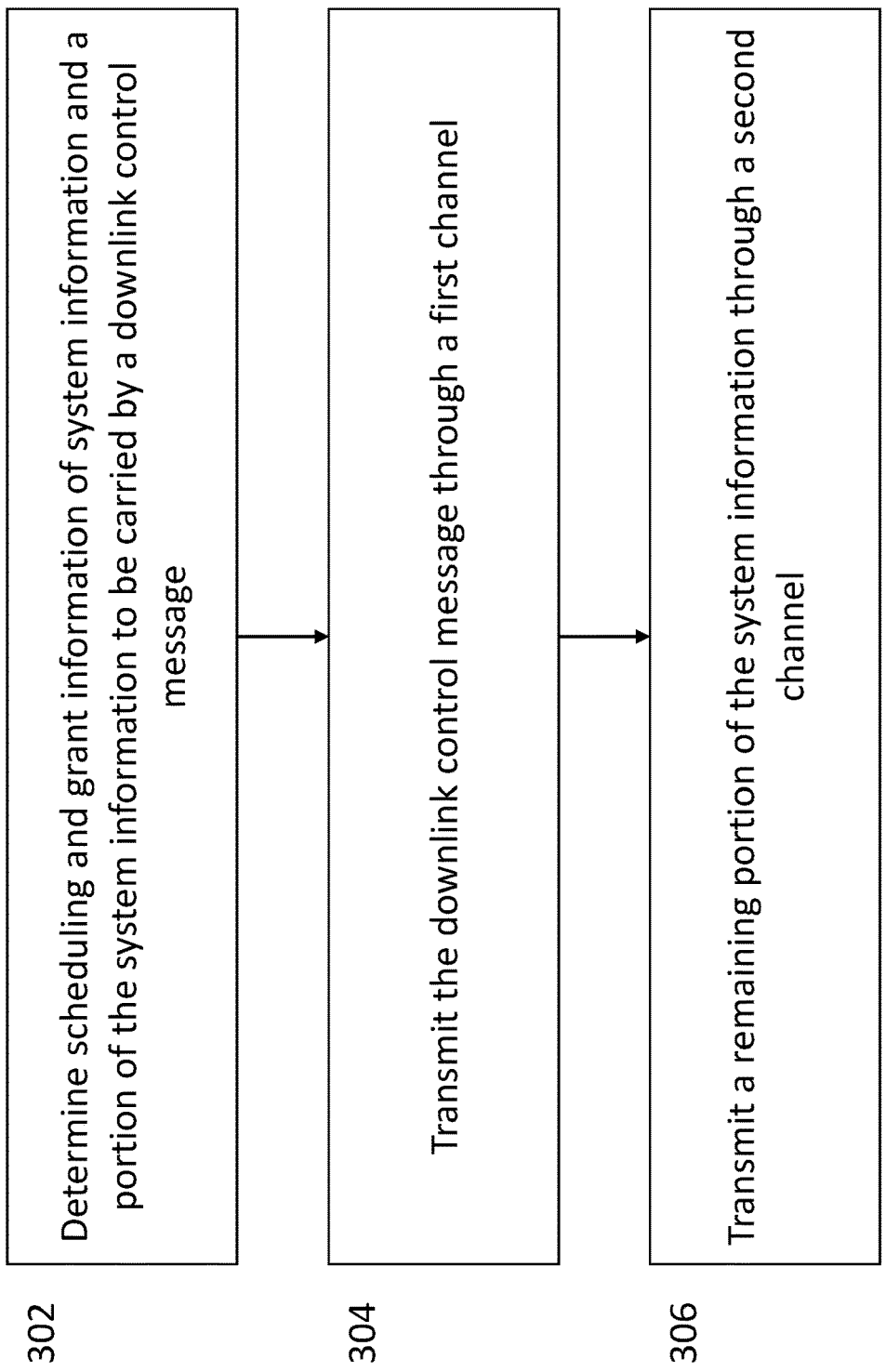
FIG. 3 illustrates a flow chart of an exemplary method performed by a base station to optimally use a downlink control signal, in accordance with some embodiments of the present disclosure.

FIG. 3 illustrates an exemplary method 300 performed by a BS to optimally use a downlink control message, in accordance with some embodiments of the present disclosure. In various embodiments, the operations of the method 300 are performed by the respective components illustrated in FIGS. 1-2. For purposes of discussion, the following embodiment of the method 300 will be described in conjunction with FIGS. 1-2. The illustrated embodiment of the method 300 is merely an example. Therefore, it should be understood that any of a variety of operations may be omitted, re-sequenced, and/or added while remaining within the scope of the present disclosure.

In some embodiments, the method 300 starts with operation 302 in which respective scheduling and grant information of selected system information and a portion of the selected system information are determined to be carried by a downlink control message. In some embodiments, the downlink control message includes a DCI signal, which carries DCI of the BS 102, is configured to be transmitted from the BS 102, through a first channel, to the UE 104, as will be discussed in further detail below. In some embodiments, the selected system information includes Remaining Minimum System Information (RMSI), Other System Information (OSI), or a combination thereof that are configured to be transmitted from the BS 102, through a second channel different from the first channel, to the UE 104, as will also be discussed in further detail below. In some embodiments, the OSI is typically referred to as a remaining portion of System Information (SI) after excluding Minimum System Information (MSI), which can carry at least: System Frame Number (SFN), a list of Public Land Mobile Networks (PLMN's), a cell identity, Random Access Channel (RACH) parameters, cell camping parameters, scheduling information for the OSI, from the SI; and the RMSI is typically referred to as a remaining portion of the MSI after excluding a Master Information Block (MIB) from the MSI.

In some embodiments, the respective scheduling and grant information of such selected system information, for example, RMSI and/or OSI, are determined by the BS 102 at operation 302. More specifically, the scheduling and grant information include respective Modulation and Coding Scheme (MCS) information and allocated time/frequency resources information of the RMSI and/or OSI. Further, in some embodiments, the BS 102 may further determine a portion of the RMSI and/or OSI to be carried by the DCI signal. In some embodiments, such a portion of the RMSI and/or OSI may include Synchronization Signal (SS) raster information, one or more Public Land Mobile Network (PLMN) identities, typically knows as PLMD s, associated with the BS 102, and part of the OSI. In some embodiments, after the BS 102 determines the MCS information and allocated time/frequency resources information and the portion (e.g., the SS raster information, PLMN ID's, etc.) of the RMSI and/or OSI, the BS 102 may allocate the above-mentioned information into respective field(s), or bit(s), of a DCI format (e.g., DCI format 1_0) configured to be used by the DCI signal.

In the example in which the SS rater information is determined to be carried by the DCI signal, in some embodiments, the BS 102 may indicate the SS rater information as an offset between a first predefined SS raster interval (e.g., 900 kHz) and a second predefined SS raster interval (e.g., 5 kHz). More specifically, the offset of the SS raster information may be used by the UE 104 to precisely find a frequency position of an carrier allocated for the UE 104. In some embodiments, the offset may indicate how many second predefined SS raster intervals is shifted from one of a plurality of broadcasted frequency positions that are separated apart from each other along a frequency domain by the first predefined SS raster interval. As such, since the SS rater information will be transmitted to the UE 104 as the DCI signal (as will be discussed below), the UE 104 can decode the correct frequency position of the allocated carrier more precisely.

Next, the method 300 continues to operation 304 in which the downlink control message is transmitted through a first channel. Continuing with the above example in which the downlink control message is a DCI signal, in some embodiments, the BS 102 may transmit the DCI signal to the UE 104 using a Physical Downlink Control Channel (PDCCH). The method 300 continues to operation 306 in which a remaining portion of the selected system information is transmitted through a second channel. In some embodiments, the second channel is different form the first channel. Still using the same example, in some embodiments, the BS 102 may transmit the remaining portion of the RMSI and/or OSI (i.e., the portion that is not carried by the DCI signal) to the UE 104 using a Physical Downlink Shared Channel (PDSCH).

Figure 4:
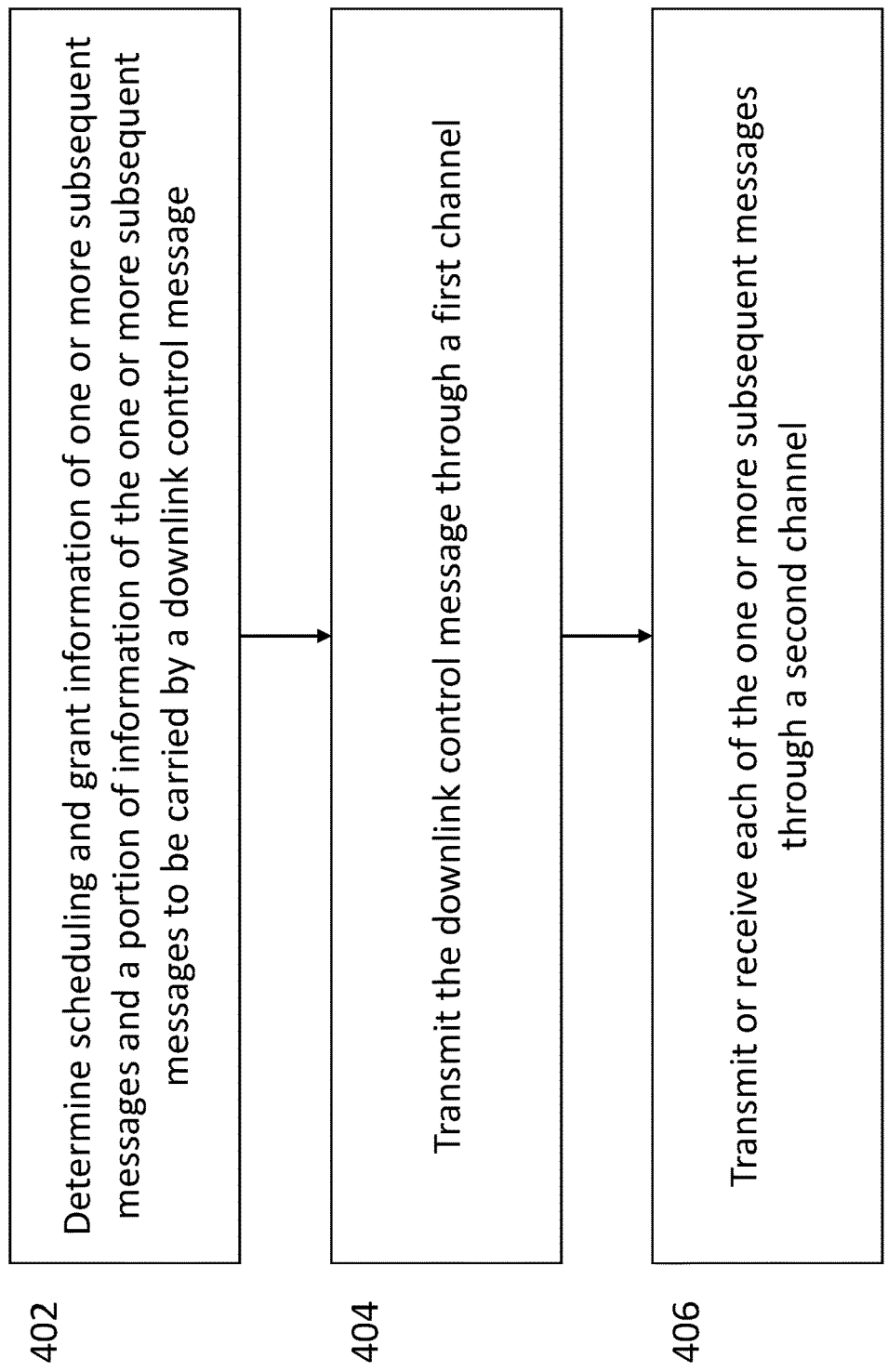
FIG. 4 illustrates a flow chart of another exemplary method performed by a base station to optimally use a downlink control signal, in accordance with some embodiments of the present disclosure.

FIG. 4 illustrates an exemplary method 400 performed by a BS to optimally use a downlink control message, in accordance with some embodiments of the present disclosure. In various embodiments, the operations of the method 400 are performed by the respective components illustrated in FIGS. 1-2. For purposes of discussion, the following embodiment of the method 400 will be described in conjunction with FIGS. 1-2. The illustrated embodiment of the method 400 is merely an example. Therefore, it should be understood that any of a variety of operations may be omitted, re-sequenced, and/or added while remaining within the scope of the present disclosure.

In some embodiments, the method 400 starts with operation 402 in which respective scheduling and grant information of one or more subsequent messages and a portion of information of the one or more subsequent messages are determined to be carried by a downlink control message. In some embodiments, the downlink control message includes a DCI signal, which carries DCI of the BS 102, is configured to be transmitted from the BS 102, through a first channel, to the UE 104, as will be discussed in further detail below. In some embodiments, the one or more subsequent messages include a Msg 2 (typically known as a random access response message), a Msg 3 (typically known as a connection request message), or any of other messages during a random access procedure, that are configured to be transmitted from the BS 102, through a second channel different from the first channel, to the UE 104, or received by the BS 102 through a different channel other than the first channel, as will also be discussed in further detail below.

In some embodiments, the respective scheduling and grant information of such subsequent messages, for example, Msg 2 and Msg 3, are determined by the BS 102 at operation 402. More specifically, the scheduling and grant information include respective Modulation and Coding Scheme (MCS) information and allocated time/frequency resources information of the Msg 2 and MCS information and allocated frequency resources information of the Msg 3. Further, in some embodiments, the BS 102 may further determine a portion of information originally configured to be carried by the Msg 2 to be carried by the DCI signal. In some embodiments, such a portion of the information of the Msg 2 may include a Timing Advanced (TA) value and a Temporary Cell Specific Radio Network Temporary Identity (C-RNTI) that are respectively assigned by the BS 102. In some embodiments, after the BS 102 determines the MCS information and allocated time/frequency resources information of the Msg 2 and/or Msg 3 and the portion of information of the Msg 2 (e.g., the TA, C-RNTI, etc.), the BS 102 may allocate the above-mentioned information into respective field(s), or bit(s), of a DCI format (e.g., DCI format 1_0) configured to be used by the DCI signal.

Next, the method 400 continues to operation 404 in which the downlink control message is transmitted through a first channel. Continuing with the above example in which the downlink control message is a DCI signal, in some embodiments, the BS 102 may transmit the DCI signal to the UE 104 using a Physical Downlink Control Channel (PDCCH). The method 400 continues to operation 406 in which the one or more subsequent messages are each either transmitted or received through a second channel. In some embodiments, the second channel is different form the first channel. Still using the same example, in some embodiments, the BS 102 may transmit the Msg 2 to the UE 104 using a Downlink Shared Channel (DL-SCH), or receive the Msg 3 from the UE 104 through an Uplink Shared Channel (UL-SCH).

In some embodiments, upon receiving the above-described DCI signal, the UE 104 may use the information carried in the DCI signal to perform corresponding operations. For example, after the UE 104 receives the MCS information and allocated frequency resources information of the Msg 3, the UE 104 may use such information to send the Msg 3 so as to continue the random access procedure.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication node, comprising:
   transmitting a downlink control information (DCI) signal to a wireless communication device through a first channel, wherein the DCI signal contains scheduling and grant information of system information configured to be transmitted in the first channel and other system information (OSI) that is configured to be transmitted through a second channel different from the first channel; and
   transmitting a second portion of the system information through the second channel.

2. The method of claim 1, wherein the first channel is a Physical Downlink Control Channel (PDCCH), and the second channel is a Physical Downlink Shared Channel (PDSCH).

3. The method of claim 1, wherein the DCI further contains Remaining Minimum System Information (RMSI).

4. The method of claim 3, wherein the DCI further contains offset information between a first Synchronization Signal (SS) raster and a second SS raster, the second SS raster being substantially smaller than the first SS raster.

5. The method of claim 3, wherein the DCI further contains an identity of a Public Land Mobile Network (PLMN) associated with the wireless communication node.

6. The method of claim 1, wherein the DCI signal further indicates respective Modulation and Coding Scheme (MCS) information and resource allocation information associated with a random access response message transmitted from the wireless communication node to the wireless communication device.

7. The method of claim 6, wherein the DCI signal further indicates respective MCS information and resource allocation information associated with a connection request message that is configured to be transmitted by the wireless communication device in response to the random access response message.

8. The method of claim 6, wherein the DCI signal further indicates a Timing Advance (TA) value and/or a Temporary Cell Specific Radio Network Temporary Identity (C-RNTI).

9. A method performed by a wireless communication device, comprising:
   receiving a downlink control information (DCI) signal from a wireless communication node through a first channel, wherein the DCI signal contains scheduling and grant information of system information configured to be transmitted in the first channel and other system information (OSI) that is configured to be transmitted through a second channel different from the first channel; and
   receiving a second portion of the system information through the second channel.

10. The method of claim 9, wherein the first channel is a Physical Downlink Control Channel (PDCCH), and the second channel is a Physical Downlink Shared Channel (PDSCH).

11. The method of claim 9, wherein the DCI further contains Remaining Minimum System Information (RMSI).

12. The method of claim 11, wherein the DCI further contains offset information between a first Synchronization Signal (SS) raster and a second SS raster, the second SS raster being substantially smaller than the first SS raster.

13. The method of claim 11, wherein the DCI further contains an identity of a Public Land Mobile Network (PLMN) associated with the wireless communication node.

14. The method of claim 9, wherein the DCI signal further indicates respective Modulation and Coding Scheme (MCS) information and resource allocation information associated with a random access response message transmitted from the wireless communication node to the wireless communication device.

15. The method of claim 14, wherein the DCI signal further indicates respective MCS information and resource allocation information associated with a connection request message that is configured to be transmitted by the wireless communication device in response to the random access response message.

16. The method of claim 14, wherein the DCI signal further indicates a Timing Advance (TA) value and/or a Temporary Cell Specific Radio Network Temporary Identity (C-RNTI).

\* \* \* \* \*